June 24, 1958 A. H. WULFSBERG 2,840,713
MULTIPLE TONE OSCILLATOR SYSTEM HAVING CONSTANT
PEAK OUTPUT VOLTAGE
Filed March 19, 1956
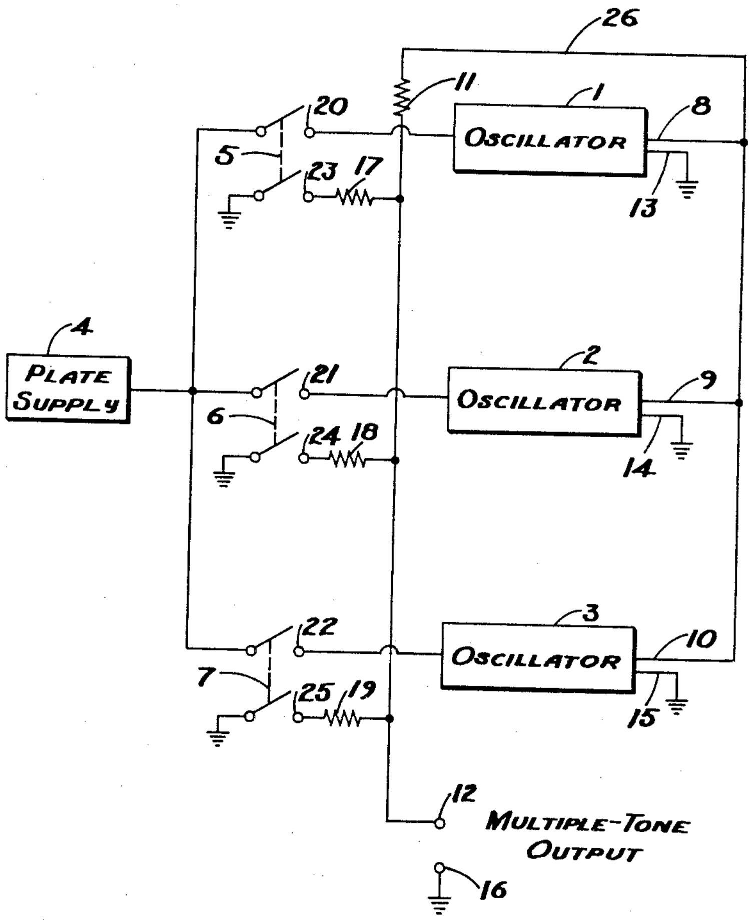
INVENTOR.
ARTHUR H. WULFSBERG
BY Marvin Moody
ATTORNEY United States Patent Office 2,840,713

Patented June 24, 1958

2,840,713

MULTIPLE TONE OSCILLATOR SYSTEM HAVING CONSTANT PEAK OUTPUT VOLTAGE

Arthur H. Wulfsberg, Cedar Rapids, Iowa, assignor to Collins Radio Company, Cedar Rapids, Iowa, a corporation of Iowa Application March 19, 1956, Serial No. 572,334

2 Claims. (Cl. 250—36)

This invention relates to coding systems used for remote control and particularly to coding systems that use a plurality of electronic oscillators for generating different tones. In certain remote control systems a number of oscillators in the audio and supersonic range are used at the controlling station. The oscillators may be operated individually for producing a single tone for controlling one remote circuit at a time, or the oscillators may be operated in combinations to produce a combination of tones for operating a corresponding number of remote circuits simultaneously. For example, in one particular application the control station has a multiple-tone control system that includes 20 oscillators. Any one oscillator may be operated alone, or several oscillators in any selected combination may be operated simultaneously. The output of this multiple-tone system is applied to a modulator amplifier circuit and after the tones are amplified, they are utilized to modulate a high frequency carrier signal. It is desirable that the carrier signal be fully modulated when only one oscillator is in operation and still not be over-modulated when a number of oscillators are in operation simultaneously. One means of obtaining the desired modulation regardless of the number of oscillators that are operating, is to provide automatic amplitude control or compressor circuits at the input of the modulator circuits. This system is relatively complicated and somewhat difficult to keep in proper adjustment. In this invention, a simple amplitude control circuit is incorporated in the multiple-tone oscillator system at the control station.

An object of this invention is to provide means for obtaining substantially constant output from a multiple-tone oscillator system regardless of the number of oscillators that are in operation.

An example of multiple-tone oscillator systems is shown in the single figure in which, for simplicity, only three oscillators are shown in conjunction with the amplitude limiting circuit. The individual oscillators 1, 2, and 3 are enabled for operation by connecting plate supply 4 through switches 5, 6, and 7 respectively to their plate circuits. The output of the oscillators 1, 2, and 3 is applied to the individual output conductors 8, 9, and 10 which are connected to a common conductor 26. The common conductor 26, upon which is applied the output of all operated oscillators, is connected through series resistor 11 to multiple-tone output terminal 12. The oscillator output circuits are completed through conductors 13, 14, and 15 and through the chassis of the equipment to another multiple-tone output terminal 16. When any one of the control switches 5, 6, or 7 is operated to close a corresponding contact 20, 21, or 22, for enabling a corresponding oscillator 1, 2, or 3, respectively, a shunt resistor 17, 18, or 19 is connected between multiple-tone output terminals 12 and 16 by contacts 23, 24, or 25, respectively.

Operation of a plurality of control switches simultaneously enables corresponding oscillators for applying output voltage to the output terminals and also connects corresponding shunt resistors across the output terminals. For example, when control switches 5 and 6 are operated simultaneously, oscillators 1 and 2 are enabled and shunt resistors 17 and 18 are connected across output terminals 12 and 16. Although the peak voltage that is applied to the common output conductor 26 is higher when more oscillators are operating, the peak voltage applied across output terminals 12 and 16 may be maintained approximately constant. The increased number of shut resistors that is connected across the output terminals causes a smaller proportion of the total voltage to appear across the output terminals and a correspondingly greater proportion to appear across the series resistor 11.

Assuming that the output voltages of the oscillators are equal, the peak output voltage of the system will be very nearly constant regardless of the number of oscillators in operation providing the resistance values of shunt resistors 17, 18, and 19 are equal and of much smaller value than that of series resistor 11. For example, let the resistance value of resistor 11 be 100 ohms and the value of each of the shunt resistors 17, 18, and 19 be 10 ohms; then if the total peak output voltage between conductor 26 and terminal 16 for one tone is E, peak output voltage of the oscillator system is $$E\times\frac{10}{110}$$

or 0.0909 E. For two tones, the peak output voltage will be $$2E\times\frac{5}{105}$$

or 0.0952 E; for three tones, $$3E\times\frac{3\frac{1}{3}}{103\frac{1}{3}}$$

or 0.0968 E. If the value of series resistor R11 is made even larger in proportion to shunt resistors 17, 18, and 19, nearly perfect peak voltage limiting may be obtained. The resistance values may be proportioned differently for different applications so the wide range of peak voltage limiting can be provided.

The multiple-tone oscillator system described above is particularly applicable in those control systems in which different combinations of tones are used to modulate a high frequency carrier. The peak voltage limiting circuit incluuded in this system prevents over-modulation of the transmitted carrier frequency.

Although this invention has been described with respect to a particular embodiment thereof, it is not to be so limited as changes and modifications may be made therein which are within the full intended scope of the invention as defined by the appended claims.

I claim:

1. A multiple-tone generating system comprising, a plurality of electronic oscillators, a two-section switch for each one of said oscillators, a plate voltage supply, an on-off control circuit for each of said oscillators for connecting said plate voltage supply through one section of a corresponding one of said two-section switches to the respective one of said oscillators, a series resistor, a pair of output terminals for said system, individual output circuits for each of said oscillators, said output circuits being connected together to form a common output circuit, said series resistor and said pair of output terminals being connected in series across said common output circuit, a shunt resistor for each oscillator, each one of said shunt resistors having a much smaller resistance value than that of said series resistor, a peak-voltage control circuit for each one of said oscillators, each peak-voltage control circuit including the other section of a corresponding one of said switches and a corresponding one of said shunt resistors, each of said switches being operable to connect said plate voltage supply to a corresponding oscillator and to connect said corresponding shunt resistor across said pair of output terminals, said switches being operable in any selected combination, and said shunt resistors having selected resistance values for maintaining the peak voltage across said output terminals substantially constant.

2. In a multiple-tone generating system having a plurality of electronic oscillators and a pair of output terminals, a peak-voltage control circuit having a plurality of shunt resistors, a series resistor common to said oscillators, said oscillators having individual output circuits connected in parallel, said parallel output circuits being connected in series with said common series resistor and said pair of output terminals, each of said shunt resistors having small resistance compared with that of said series resistor, switching means operable to enable any number of said oscillators in any selected combination and to connect a corresponding number of said shunt resistors across said pair of output terminals, and said shunt resistors having selected resistance values for maintaining peak voltages across said output terminals substantially constant regardless of the number of said oscillators enabled for generating signal.

References Cited in the file of this patent

FOREIGN PATENTS 101,726 Switzerland ------------ Oct. 1, 1923

OTHER REFERENCES

Article: "Three-Tone Oscillator Broadcasts Time Signal" by Feldman, pages 162–163 of "Electronics" for September 1953.